United States Patent [19]

Shyu

[11] Patent Number: 5,363,445
[45] Date of Patent: Nov. 8, 1994

[54] AUXILIARY CHARGING DEVICE FOR A MOBILE TELEPHONE

[76] Inventor: Chih-Yes Shyu, 4F, No. 144, Chu-Lin Road, Yung-Ho Shih, Taipei Hsien, Taiwan, Prov. of China

[21] Appl. No.: 178,810

[22] Filed: Jan. 7, 1994

[51] Int. Cl.⁵ .................. H04M 1/00; H02K 7/14; H02K 11/00
[52] U.S. Cl. .................. 379/433; 379/434; 310/50; 310/69
[58] Field of Search .................. 379/433, 434; 455/89, 455/90; 320/61, 62, 64; 310/67 R, 50, 47, 69; 322/2 R

[56] References Cited

U.S. PATENT DOCUMENTS

| | | | |
|---|---|---|---|
| 1,399,598 | 12/1921 | Anderson | 310/69 |
| 1,512,467 | 10/1924 | Johnson | 310/69 |
| 3,370,220 | 2/1968 | Douglass et al. | 310/50 |

*Primary Examiner*—James L. Dwyer
*Assistant Examiner*—Jack Chiang
*Attorney, Agent, or Firm*—Morton J. Rosenberg; David I. Klein

[57] ABSTRACT

An auxiliary charging device for a mobile telephone includes a compartment in a lower portion of the mobile telephone for depositing an auxiliary charging device including a coil, a magnet, a revolving disc, an auxiliary gear, a main gear and an operating handle. The coil, the magnet and the auxiliary gear are secured by a vertical shaft. The main gear is secured pivotally by another vertical shaft. The operating handle is manually pushed inward to rotate the main gear, the auxiliary gear, the revolving disc and then the magnet to force the coil to produce electric current to be supplied to the mobile telephone when the battery thereof has been consumed.

2 Claims, 5 Drawing Sheets

AUXILIARY CHARGING DEVICE FOR A MOBILE TELEPHONE

BACKGROUND OF THE INVENTION

A mobile telephone is very popular nowadays, but in case the battery of the mobile telephone should be used up and no spare one is ready, the mobile telephone would become inoperative.

SUMMARY OF THE INVENTION

This invention has been devised to offer a kind of auxiliary charging device for a mobile telephone, enabling the phone operative temporarily with its function.

An auxiliary charging device for a mobile telephone in the present invention includes a compartment provided in a bottom portion of a mobile telephone for depositing an auxiliary charging device including a coil, a magnet, a revolving disc, an auxiliary gear, a main gear and an operating handle combined together in the compartment.

The coil produces electric current to be supplied to the mobile telephone for temporary use, by the magnet rotated by the revolving disc, which is rotated by the auxiliary gear having two pawls engaging ratchet teeth provided around an inner circumferential wall of an upper opening of the revolving disc. The auxiliary gear is rotated by the main gear, which is rotated by a rack of the operating handle manually swung inward. After the operating handle is swung inward, it is released and swung outward by elasticity of a spring fitted around a shaft pin fitting in fulcrum holes in two fulcrum arms of the operating handle, then the rack of the operating handle rotates the main gear in a reverse direction and the auxiliary gear rotated idle, not to rotate the revolving disc by means of pawls and ratchet teeth in the inner circumferential wall of the revolving disc. The operating handle is pivotally secured with a pivotal shaft fixed with the compartment.

BRIEF DESCRIPTION OF DRAWINGS

The invention will be better understood by reference to the accompanying drawings, wherein.

DESCRIPTION OF THE PREFERRED EMBODIMENTS

Figure 1:
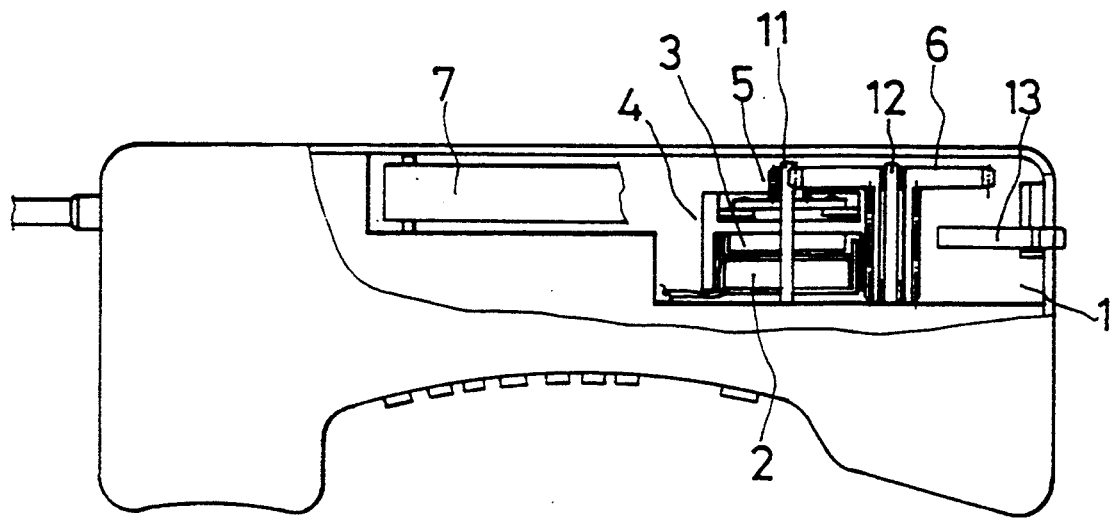
FIG. 1 is a structural view of an auxiliary charging device for a mobile telephone in the present invention.

An auxiliary charging device for a mobile telephone in the present invention, as shown in FIGS. I and 2, includes a compartment i provided in a bottom portion of a mobile telephone, a coil 2, a magnet 3, a revolving disc 4, an auxiliary gear 5, a main gear 6 and an operating handle 7 combined together and deposited in the compartment 1.

A vertical shaft 11 is provided in the compartment 1, passing through central holes of the coil unit 2, of the magnet 3, of the revolving disc 4 and of the auxiliary gear 5 one by one in order.

The coil 2 has a plurality of L-shaped metal sustainers 21 fixed firmly and diametrically on an upper and a bottom surface and projecting and spaced around a circumferential surface for sustaining the revolving disc 4 and for permitting the coil 2 to receive magnetism from the magnet 3. The coil is deposited in a lower opening of the revolving disc 4.

The disc-shaped magnet 3 has a central hole for the shaft 11 to pass through, located in the lower opening of the revolving disc 4 and on the coil 2.

The revolving disc 4 has a central hole for the shaft 11 to pass through, having an H-shaped cross-section, an upper central opening and a lower central opening defined by an inner circumferential wall and a horizontal wall for the magnet 3 and the coil 2 to fit therein, a plurality of ratchet teeth 43 in an upper portion of the inner circumferential wall. The ratchet teeth 43 engage two pawls 52, 52 provided on two ends 51, 51 of the auxiliary gear 5, forcing the revolving disc 4 turn only in one direction by engagement with the pawls 52, 52.

Another vertical shaft 12 is vertically provided in the compartment 1 for pivotally securing the main gear 6, which has a small diameter teeth 62 to engage a rack 71 provided on the pusher 7, and a large diameter teeth 61 to engage the auxiliary gear 5.

The auxiliary gear has two projecting ends 51, 51 and two separate nearly triangular pawls 52 firmly fixed with the two ends 51, 51 to engage the ratchet teeth 43 of the revolving disc 4, enabling the revolving disc 4 to turn only in one direction.

The main gear 6 has a large diameter teeth 61 and a small diameter teeth 62. The large diameter teeth 61 engage the auxiliary gear 5, and the small diameter teeth 62 engage the rack 71 of the operating handle 7.

Figure 4:
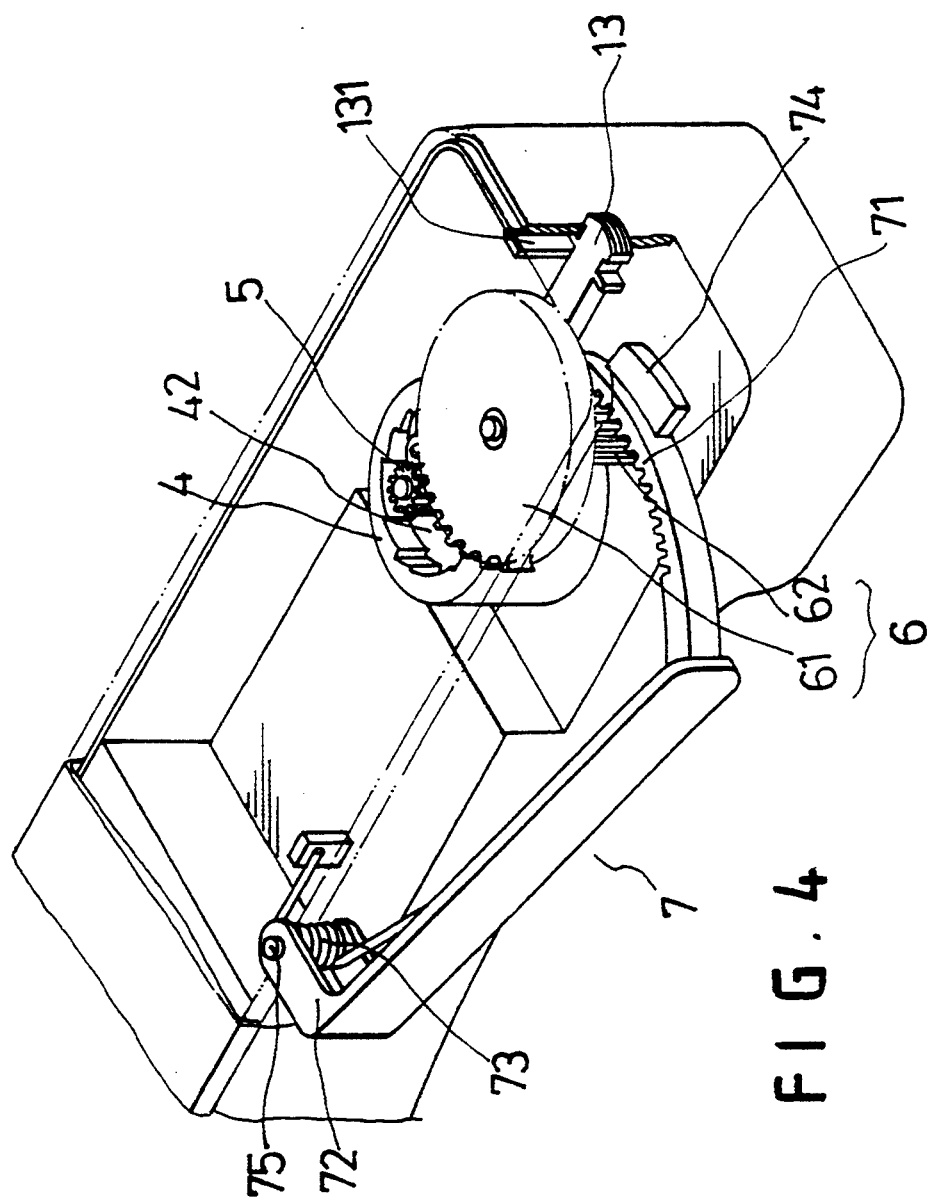
FIG. 4 is a perspective view of the auxiliary charging device for a mobile telephone in the present invention.
Figure 6:
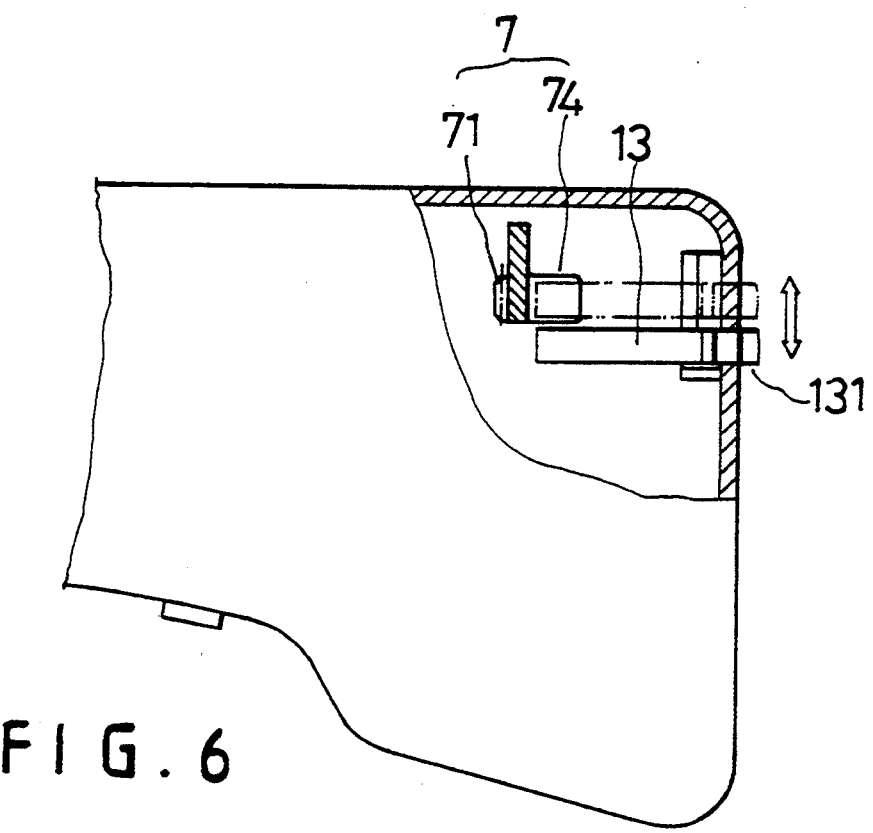
FIG. 6 is a cross-sectional view of a locking member engaging an operating handle in the auxiliary charging device for a mobile telephone in the present invention; and, FIG. 7 is an upper side view of a second embodiment of the auxiliary charging device for a mobile telephone in the present invention.

The operating handle 7 is shaped as nearly U, having a rack 71 extending from an outer end in an almost right angle to engage the small diameter teeth 62 of the main gear 6, and two short fulcrum arms 72, 72 extending from an inner end and having a fulcrum hole for a shaft pin 75 to pass through to secure the operating handle in the compartment 1 so that the operating handle 7 is pushed to swing inward, with the shaft pin 75 as a pivot, and the rack 71 can rotate the small diameter teeth 62 of the main gear 6 as shown in FIG. 4.

A spring 73 is provided to fit around the shaft pin 75 between the two fulcrum arms 72, 72 so as to always push elastically the operating handle 7 outward. A locking member 13 is provided, having a rectangular shape to fit in a notch 13 in an opening in a lower side wall of the compartment 1, and stopping a projecting block 64 affixed on a rear side of the rack 71 of the operating handle 7 to prevent the handle 7 from swinging completely outward.

Figure 7:
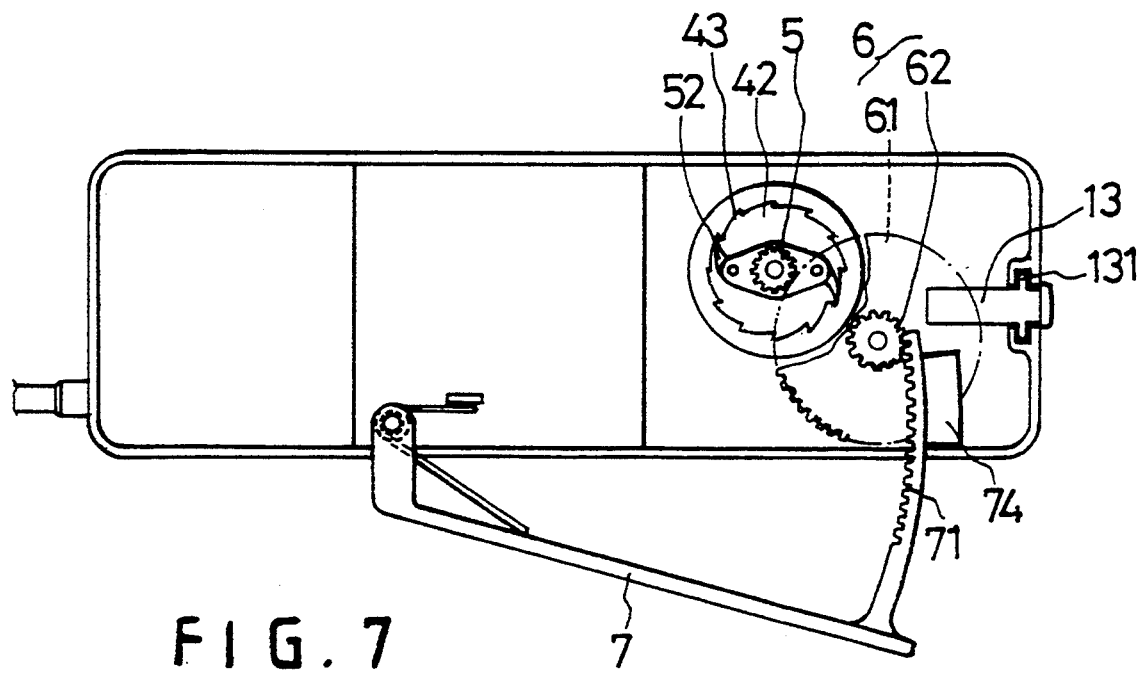
Figure 2:
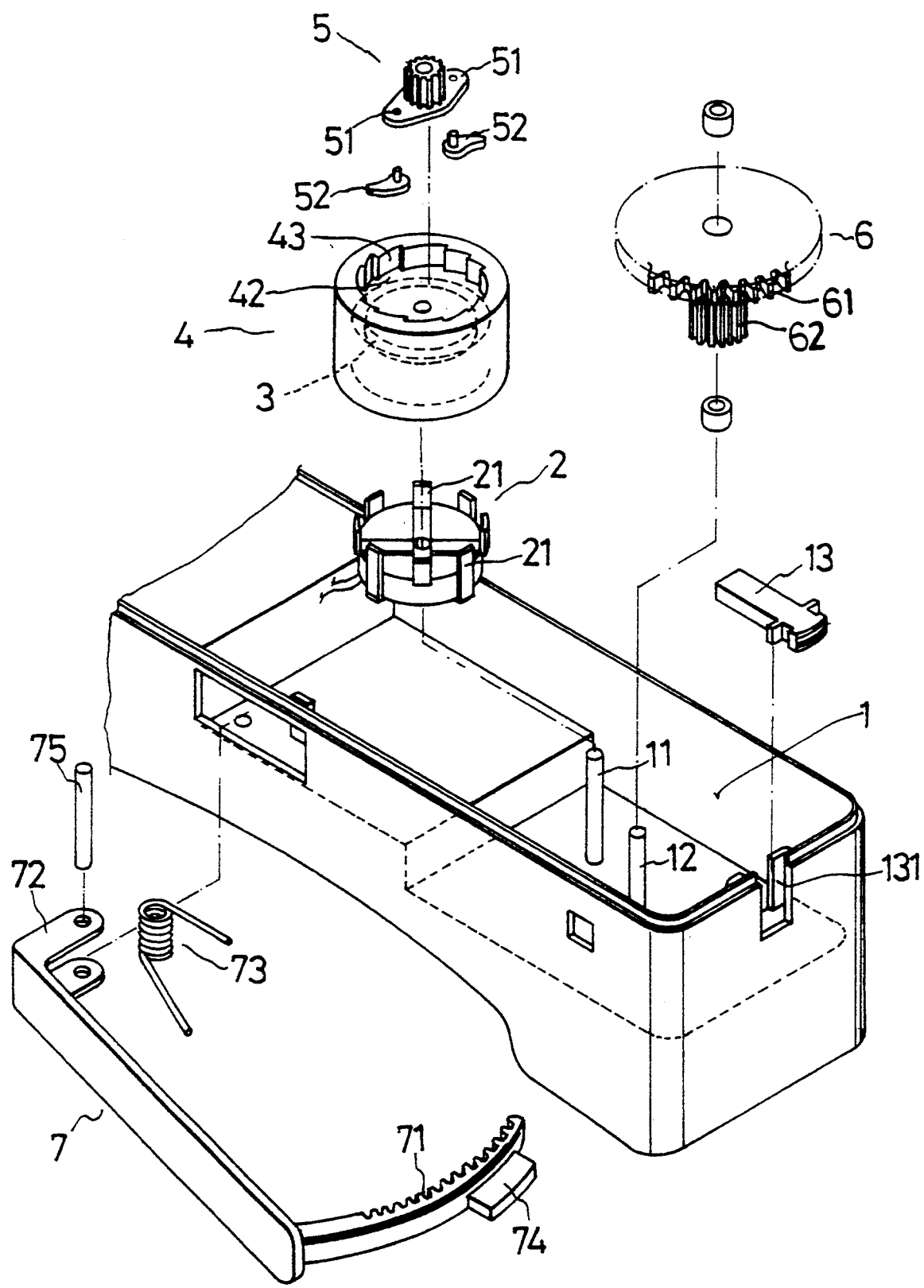
FIG. 2 is an exploded perspective view of the auxiliary charging device for a mobile telephone in the present invention.
Figure 3:
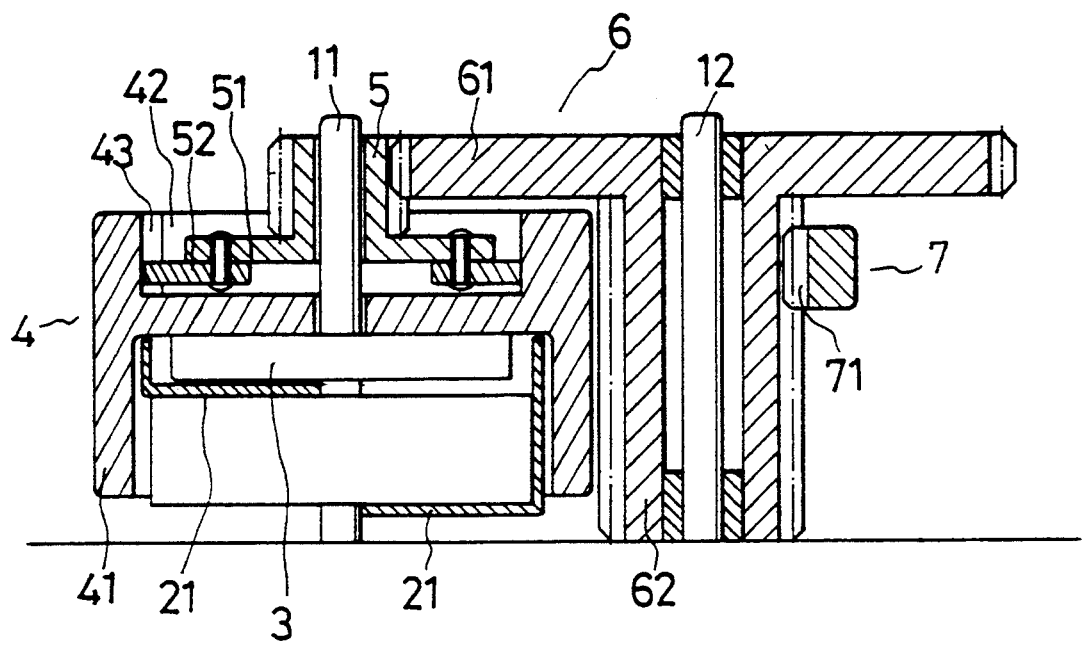
FIG. 3 is a side cross-sectional view of the auxiliary charging device for a mobile telephone in the present invention.
Figure 5:
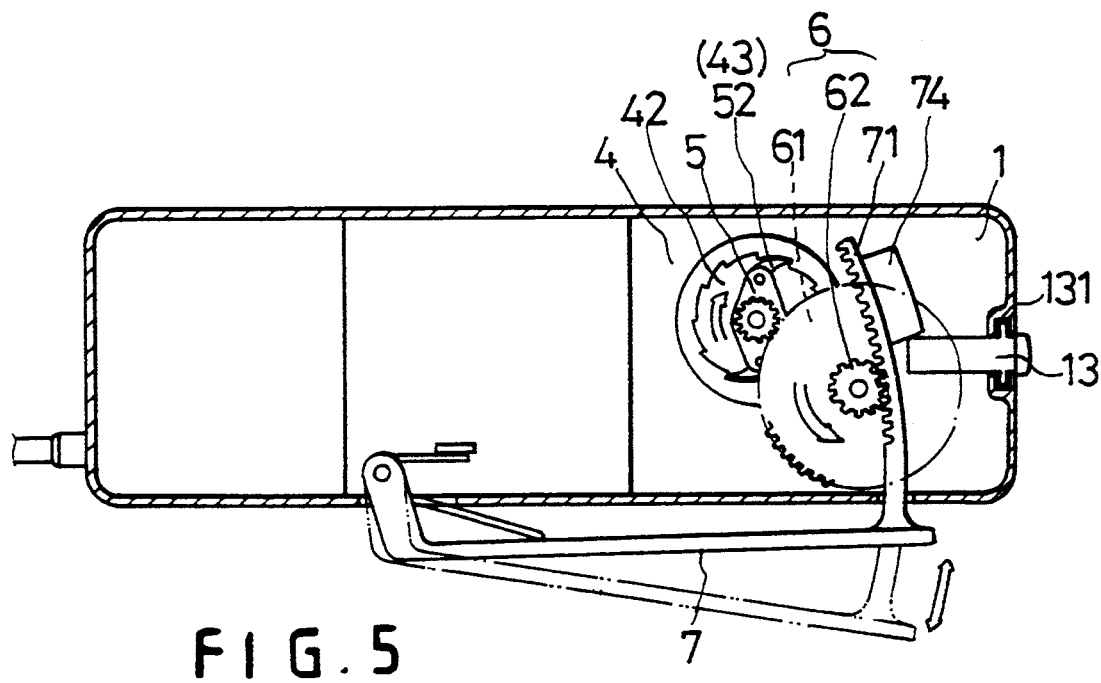
FIG. 5 is an upper side view of a first embodiment of the auxiliary charging device for a mobile telephone in the present invention.

In case batteries of a mobile telephone have been used up, the locking member 13 can be pressed down to let the projecting block 74 of the operating handle 7 disengage from the locking member 13 as shown in FIG. 5. Then the operating handle 7 moves in a position, wherein the operating handle 7 can be pushed to swing outward and inward as shown in FIG. 7. Now a user can push the operating handle 7 inward, forcing the rack 71 rotate the main gear 6 and then the auxiliary gear 5, which rotates the revolving disc 4 by means of the two pawls 52, 52 engaging the ratchet teeth 43. As the magnet 3 produces magnetism to move across the coil 2 when the disc 4 rotates, the coil 2 produces electric current to be supplied to the mobile telephone. When the operating handle 7 is released after pushed inward, it will be moved to swing outward by elasticity of the spring 73, rotating the main gear 6 and the auxiliary gear 5 in a reverse direction by the rack 71. But the ratchet teeth 43 of the revolving disc 4 cannot be rotated reversely by the pawls 52, 52 of the auxiliary gear 5, so the auxiliary gear will rotate idle in the reverse direction, not moving the revolving disc 4. Then the operating handle 7 is to be pushed inward to generate electricity again for the mobile telephone.

While the preferred embodiments of the invention have been described above, it will be recognized and understood that various modifications may be made therein and the appended claims are intended to cover all such modifications which may fall within the spirit and scope of the invention.

What is claimed is:

1. An auxiliary charging device for a mobile telephone comprising:

a compartment in a bottom portion of the mobile telephone for depositing components of said charging device described below;

a coil shaped round and having a central hole for a vertical shaft to pass through to secure said coil in said compartment, and two ends connected with input contact points of electric power of a mobile telephone; a magnet shaped round and having a central hole for said vertical shaft to pass through and placed on said coil and in a lower opening of a revolving disc;

said revolving disc having an H-shaped cross-section, a central hole for said vertical shaft to pass through and placed to have its lower opening containing said magnet and said coil and its upper opening containing an auxiliary gear, a plurality of ratchet teeth in an inner circumferential wall defining said upper opening, said ratchet teeth engaging two pawls provided on two ends of an auxiliary gear so that said revolving disc is rotated together with said auxiliary gear only in one directionn but not rotated in the reverse direction;

said auxiliary gear having a central hole for said vertical shaft to pass through and put in said upper opening of said revolving disc, two projecting-out ends under said gear body, and the two pawls respectively fixed firmly with said two projecting-out ends to engage said ratchet teeth to rotate said revolving disc only in one direction but not in the reverse direction;

a main gear having a large diameter teeth and a small diameter teeth secured by another vertical shaft in said compartment, said large diameter teeth engaging said auxiliary gear, said small diameter teeth engaging an elongate rack of an operating handle and rotated by said rack when said operating handle is manually pushed to swing inward;

said operating handle is nearly U-shaped, said operating handle having the elongate rack extending from an outer end to engage said small diameter teeth of said main gear so as to rotate said main gear when said operating handle is manually pushed to swing inward, and two fulcrum arms extending from an inner end, each said fulcrum arm having a fulcrum hole for a shaft pin to secure said operating handle with said compartment to enable said operating handle pushed inward or outward, and a spring provided to fit around said shaft pin between said two fulcrum arms to force said operating handle biased outward, a projecting block being affixed on a rear side of said rack to be stopped by a movable locking member fitted in a groove of an opening in a lower side wall of said compartment;

said operating handle being pushed manually inward to rotate said main gear, said auxiliary gear and then said magnet to let said coil produce electric current which is to be supplied to said mobile telephone, said operating handle being pushed to swing outward by elasticity of said spring after pushed to swing inward, rotating said main gear and said auxiliary gear in a reverse direction and forcing said auxiliary gear rotate idle, not rotating said revolving disc by means of said pawls of said auxiliary gear engaging said ratchet teeth of said revolving disc.

2. The auxiliary charging device for a mobile telephone as claimed in claim 1, wherein said compartment has its lower side wall provided with the opening bored with the groove for the movable locking member to fit therein to stop or release the projecting block provided on the rear side of said rack of said operating handle.

* * * * *